July 9, 1946.　　　D. B. GARDINER　　　2,403,519
POWER TRANSMISSION
Filed Aug. 24, 1939　　　3 Sheets-Sheet 2
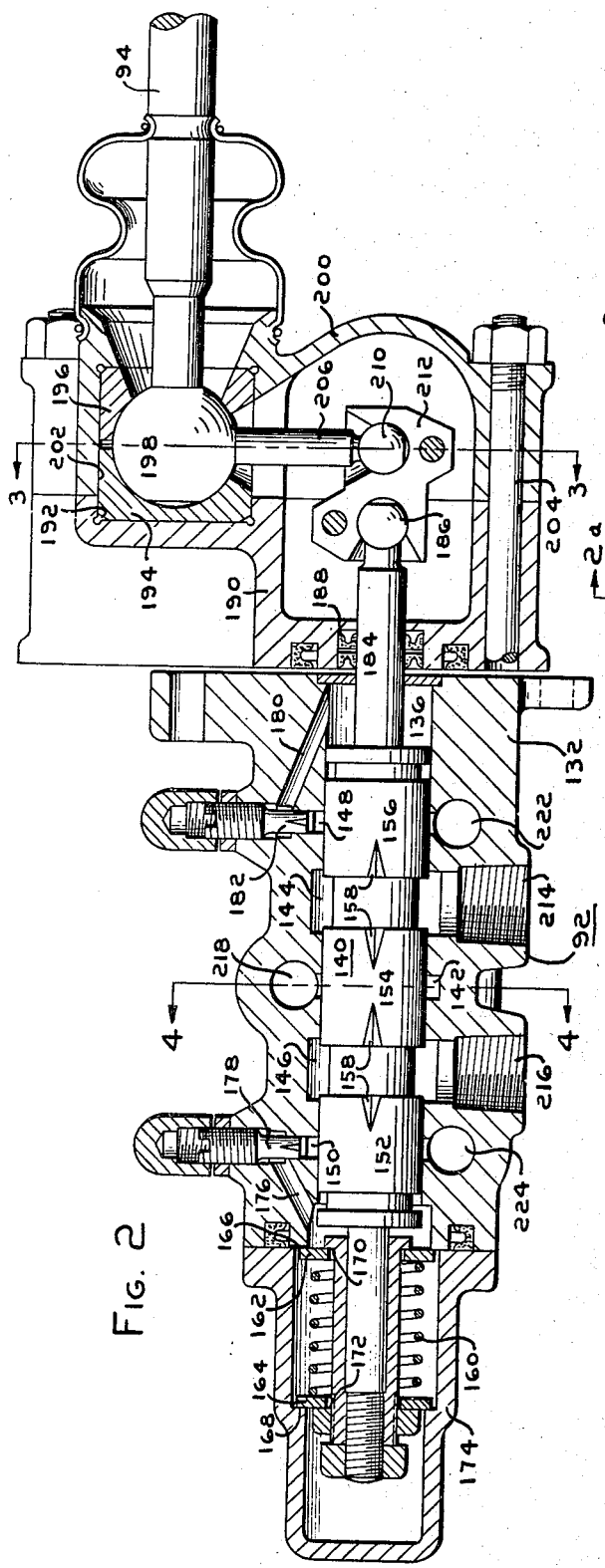
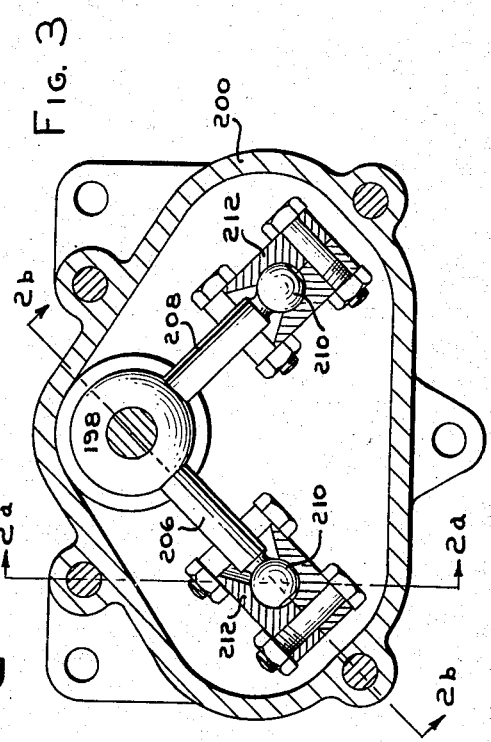
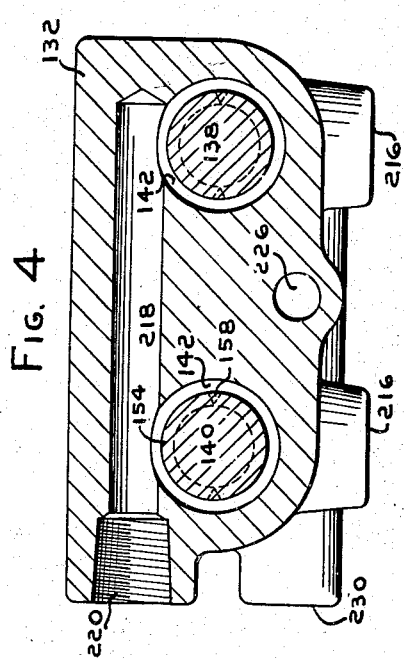
INVENTOR
DUNCAN B. GARDINER
BY
Ralph L. Tweedale
ATTORNEY

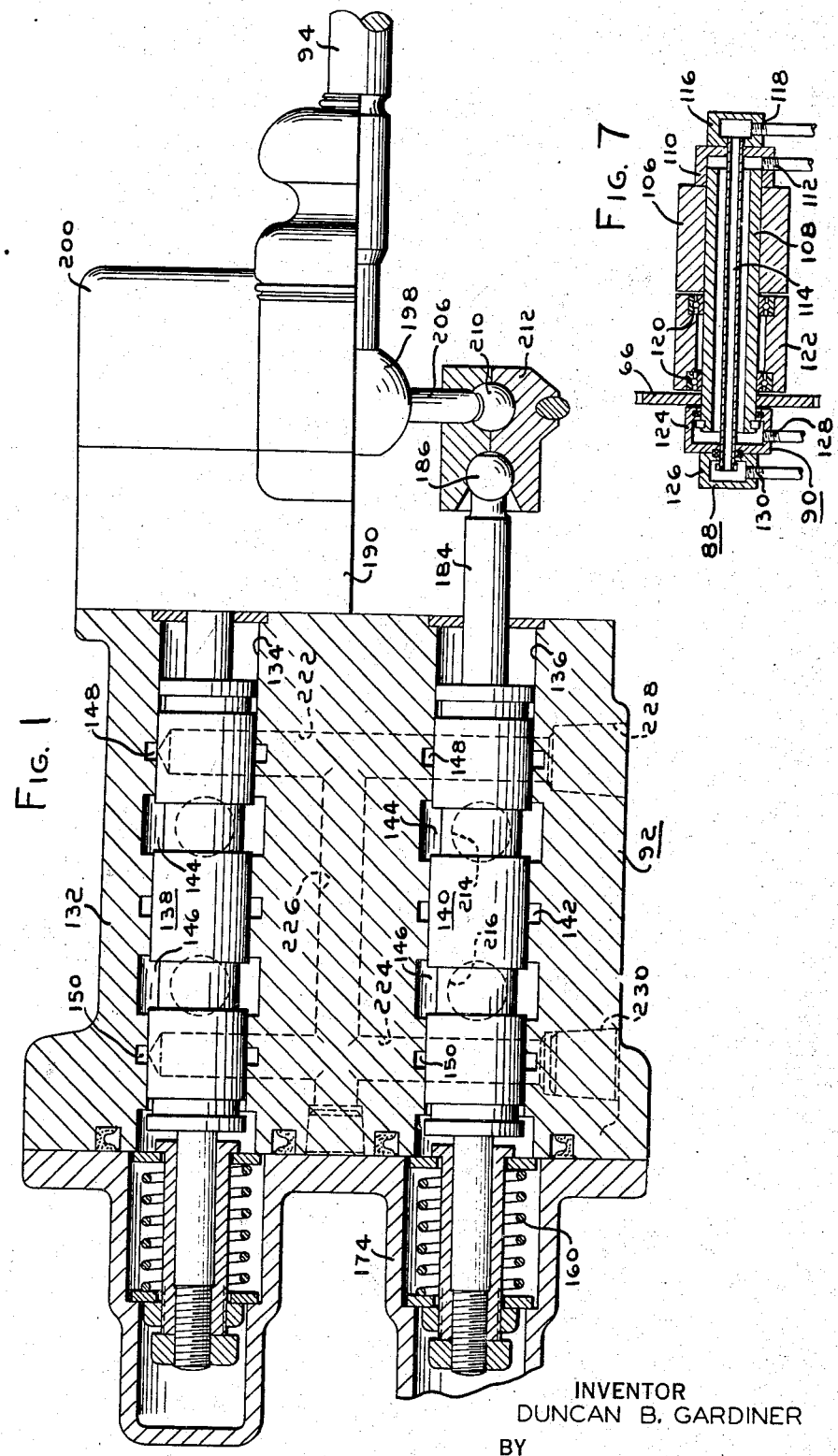

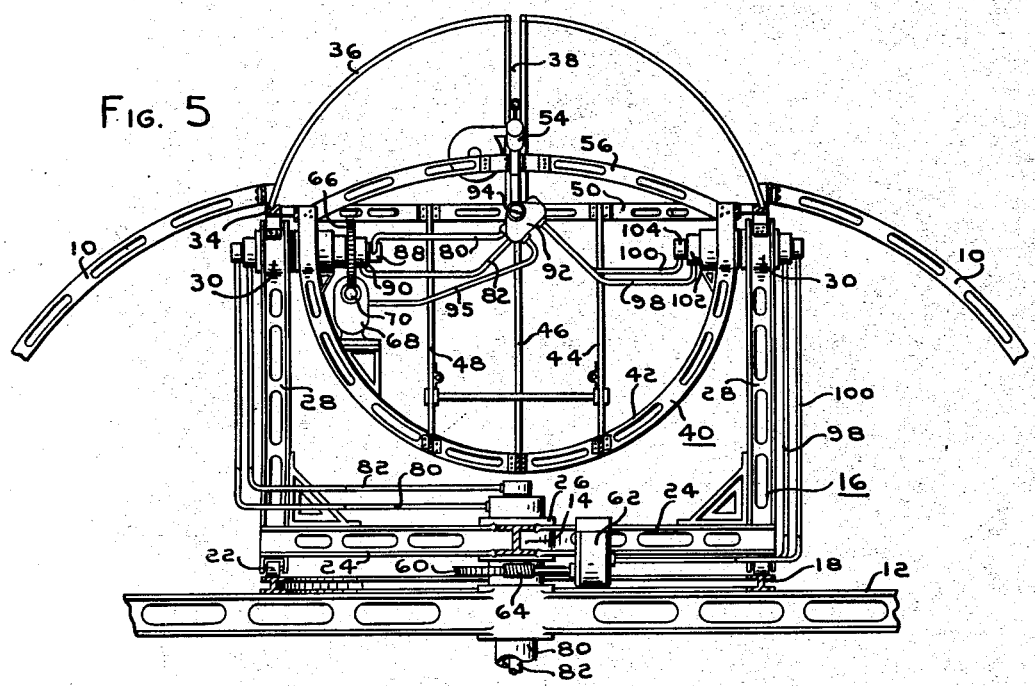

Patented July 9, 1946

2,403,519

UNITED STATES PATENT OFFICE 2,403,519

POWER TRANSMISSION

Duncan B. Gardiner, Detroit, Mich., assignor to Vickers Incorporated, Detroit, Mich., a corporation of Michigan Application August 24, 1939, Serial No. 291,631

8 Claims. (Cl. 60—97)

This invention relates to power transmissions, particularly to those of the type comprising two or more fluid pressure energy translating devices one of which may function as a pump and another as a fluid motor.

The invention is more particularly concerned with a power transmission system for driving a load device separately or simultaneously at any desired rate in each of two different planes of movement. A system of this character finds particular usefulness in operating such devices as a gun turret wherein the gun mount may be pointed in any direction by the separate or simultaneous actuation of the training and elevating portions of the mount.

The operation of turrets and similar devices by hydraulic power transmission means has long been customary, the usual control system being one operating on the follow-up principle whereby separate handwheels for the elevating motion and the training motion may be selectively operated in either direction, and through the medium of separate follow-up control mechanisms the hydraulic transmission systems are caused to operate in a manner to make the gun mount follow the movements imparted to each handwheel. Systems of this character have been widely used on shipboard mounts and have been found admirably suited for the purpose. Various attempts have heretofore been made to apply similar transmission systems to gun mounts aboard aircraft which, due to the more stringent requirements of aircraft service, have heretofore been not entirely successful. Due to the very great speed at which aircraft travel in the present state of the art the required speeds of turret operation are correspondingly higher, and in addition, the light weight construction necessary for aircraft has militated against the successful use of follow-up control systems for this class of service.

It is an object of the present invention to provide a power transmission system and control therefore particularly adapted for operating a load device in two different planes of movement which is simple and of light construction in which control of the load device is provided without the use of follow-up mechanism while permitting substantially equal accuracy of control at high speed with less effort by an operator.

Another object is to provide in a transmission system of this character a control system in which protection of the drive apparatus is afforded by imparting to the control-operating handle a "feel" which corresponds to the load being imposed on the driving apparatus at all times.

Further objects and advantages of the present invention will be apparent from the following description, reference being had to the accompanying drawings wherein a preferred form of the present invention is clearly shown.

In the drawings:

Figure 1 is a longitudinal cross section of a control valve incorporating a preferred form of the present invention.

Figure 2 is a cross sectional view of the valve illustrated in Figure 1, the left-hand portion of the view being taken on line 2a—2a of Figure 3 while the right-hand portion is taken on line 2b—2b of Figure 3.

Figure 3 is a cross section on line 3—3 of Figure 2.

Figure 4 is a cross section on line 4—4 of Figure 2.

Figure 5 is a fragmentary transverse section of an aircraft fuselage incorporating a power transmission system constructed in accordance with the present invention.

Figure 6 is a longitudinal section of the structure illustrated in Figure 5 showing diagrammatically also the power transmission circuit.

Figure 7 is a cross section on line 7—7 of Figure 6.

Referring first to Figures 5 and 6, there is illustrated a fragment of an aircraft fuselage including outer frame members 10 and a transverse beam 12 on which is pivotally mounted at 14 a rotatable turret structure generally designated as 16. A circular track 18 secured to the cross beam 12 and to auxiliary cross beams 20 forms the path on which rollers 22 secured to the undersurface of the turret structure 16 may roll.

The turret structure may comprise four or more radially extending arms 24 secured to a hub member 26, two of the arms as shown in Figure 5 carrying upright columns 28 having pivotal mountings 30 positioned at the upper end thereof. Secured to the top of the columns 28 and supported by light uprights 32 on the other two radial arms 24 is a ring 34 on which is secured a transparent dome 36 of spherical contour having a slot 38 therein through which a gun may be fired.

The pivotal mountings 30 support an inner cage 40 comprising a semicircular beam 42, at right angles to which three other semicircular beams 44, 46 and 48 are secured. A ring member 50 is secured to the upper ends of the semicircular beams thus providing a cage which is roughly hemispherical in shape and diametrically supported on the pivotal mountings 30. The cage 40 may be provided with a gunner's seat 52 and a gun 54 supported by an arch member 56 and a forwardly extending strut 58. It will be seen that the gun and gunner may be trained in azimuth by rotation of the entire turret structure 16 about the pivotal axis 14 and may be separately or simultaneously moved in elevation about the axis of the pivotal mountings 30 by operation of the pivoted cage 40 thus providing for aiming the gun in any direction within a spherical angle of 180 degrees. The mechanism thus far described is illustrative of the type of load device which the transmission system of the present invention is particularly adapted to operate and per se forms no part of the present invention.

For the purpose of training the turret structure 16, a worm wheel 60 may be stationarily mounted on the fixed frame structure at the pivotal axis 14, and a rotary fluid motor 62 of conventional type may be mounted on the turret structure 16 for driving a worm 64 meshing with the worm wheel 60. A suitable gear casing, not shown, may be provided for enclosing the worm gearing 60—64.

For the purpose of rotating the cage 40 in elevation a similar worm wheel 66 may be rigidly secured to the stationary trunnion at the pivotal mounting 30, a fluid motor 68 being mounted on the cage 40 for driving a worm 70 meshing with the worm wheel 66, a suitable gear casing, not shown, being also provided for these gears.

For the purpose of driving the fluid motor 62 and 68 a suitable source of pressure fluid illustrated in Figure 6 as comprising a reservoir 72, a pump 74, an accumulator 76, and an unloading valve 78 may be provided at a suitable position in the main portion of the aircraft. The details of the pressure source forming no part of the present invention and being well known in the art, further description thereof will be dispensed with, it being understood that pressure fluid is supplied through a delivery line 80, the spent fluid being returned to the reservoir 72 through a return line 82.

The lines 80 and 82 extend through the pivotal mounting 14, suitable swivel connections being provided at 84 and 86 to permit of necessary rotary movement and extend through the pivotal mountings 30 where similar swivel connections 88 and 90 may be provided for taking care of the rotary movement of cage 40 relative to turret 16. Within the cage 40 the lines 80 and 82 extend to the pressure and tank ports of a duplex control valve generally designated as 92 which is mounted in the cage 40 somewhat forward of the center thereof and has a rearwardly projecting control lever 94 positioned for convenient actuation by an operator positioned in the gunner's seat 52. From the control valve 92 a pair of conduits 95 and 96 extend to the fluid motor 68. A second pair of conduits 98 and 100 extend to swivel connections 102 and 104 at the right-hand pivotal mounting 30 and extend outside the turret structure 16 downwardly and inwardly to the fluid motor 62.

The construction of the swivel connections at 30 is illustrated in Figure 7 from which it will be seen that the upright 28 carries a hub 106 to which is rigidly secured a tubular trunnion 108 having an end cap 110 stationarily secured thereto and provided with a conduit connection 112. Concentric with the trunnion 108 is an internal tube 114, the right-hand end of which is secured to a hollow end cap 116 having a pipe connection at 118. Journalled on the trunnion 108 by anti-friction bearings 120 is a hub 122 secured to the semicircular beam 42. Rigidly secured to trunnion 108 at the left-hand side of the hub 122 is the worm gear 66. Suitable packed swivel heads 124 and 126 close the ends of the trunnion 108 and the tube 114 and contain pipe connections 128 and 130. The construction at the pivotal mounting 14 may be similar to that described except that the worm wheel 60 is shown as mounted between the stationary hub on beam 12 and the rotatable hub on the turret 16.

Referring now to Figures 1 through 4, the construction of the dual control valve 92 is there illustrated. The valve comprises a main body member 132 having two longitudinal bores 134 and 136 therein each of which is provided with a slidable spool 138 and 140 respectively. The bores and spools may be identical so that only one of them need be described. Thus, each bore is provided with a central pressure port 142, with motor ports 144 and 146 and with tank ports 148 and 150. The spool is provided with three lands 152, 154 and 156 normally blocking the pressure and tank ports from communication with the cylinder ports. Suitable tapered grooves 158 are provided in the lands facing in the direction of the motor ports 144 and 146 and are preferably so graduated as to provide a gradual opening to flow in substantially direct proportion to the degree of movement of the spool away from neutral position illustrated. The valve spool may be biased to neutral position by a centering spring 160 together with suitable abutment washers 162 and 164 cooperating with shoulders 166 and 168 associated with the body, and shoulders 170 and 172 associated with the spool. The centering means may be enclosed by an end cap 174 which also serves to close the left-hand ends of the valve bores.

An angular passage 176 communicates between the left-hand end space of the valve bore and an adjustable restrictor 178 providing a restricted path for flow between the end chamber and the tank port 150. At the right-hand end of the valve bore an angular passage 180 connects to a similar adjustable restrictor 182 communicating with the tank port 148.

The right-hand end of the spool is provided with a stem 184 having a ball end 186 and projects through a packing 188 provided in an end plate 190 secured to the right-hand face of the body member 132. The end plate 190 is provided with a recess 192 positioned to one side of the plane joining the axes of the two valve bores 134 and 136 and equidistant therefrom. A ball socket member 194 is positioned in the recess 192 and together with a second socket member 196 forms a ball socket for the reception of a ball 198 integrally mounted on the inner end of the control handle 94. The socket members 194 and 196 are retained in position by an end plate 200 having a recess 202 in alignment with the recess 192 and secured in abutment with the plate 196. Suitable studs 204 secure the plates 190 and 200 to the left-hand face of the body 132.

Secured in the ball 198 at right angles to each other and at right angles to the handle 94 are a pair of operating arms 206 and 208 having ball ends 210. The latter are connected to the ball ends 186 on valve stems 184 by split coupling members 212 forming a link between the balls 210 and 186. It will be seen that the handle 94 is universally pivoted at the ball 198 for a limited angular movement in any direction away from the neutral position illustrated.

Referring to Figure 3, if the lever 94 be rocked in the plane which includes the axis of the left-hand valve member and the ball 198, it will be seen that the left-hand valve member only will be operated and may be shifted to the left in Figure 2 by moving the lever downwardly and to the left, or to the right in Figure 2 by moving the lever upwardly and to the right. Conversely, the right-hand valve stem may be shifted independently of the left-hand valve stem by rocking of the handle 94 in a plane including the ball 198 and the axis of the right-hand valve. By rocking of the handle 94 in a vertical plane in Figure 3, both valves may be actuated equally and simultaneously in the same directions. By rocking the handle in a horizontal plane in Figure 3 both may be actuated equally and simultaneously in opposite directions. By rocking in any intermediate plane, both valves may be actuated simultaneously but to different degrees.

The valve body 132 is provided with pipe connections 214 and 216 communicating with the motor ports 144 and 146. A transverse bore 218 (see Figures 2 and 4) connects a pressure line pipe connection 220 with the pressure port 142 in both valve bores. Similar transverse bores 222 and 224 connect the tank ports 148 and 150 in both valve bores and are connected together by a longitudinal central bore 226 (see Figure 1). The bores 222 and 224 are provided with external pipe connections at 228 and 230, the latter being plugged.

In operation, assuming that the pump 74 is operating and that the accumulator 76 is filled maintaining a supply of oil under pressure for delivery to the line 80 as required, with the handle 94 in the neutral position illustrated, both valve spools 138 and 140 will remain in neutral and no oil will flow to either motor 62 or motor 68, the unloading valve serving to bypass the pump delivery to tank at negligible pressure whenever the accumulator is filled.

If it is desired to swing the turret structure 16 about the axis 14 without swinging the cage 40 about the axis 30, the control handle 94 may be shifted to one side or the other, let us say to the left in Figure 5 or upwardly and to the left in Figure 3, thereby shifting the spool 138 to the right in Figure 1 admitting pressure oil from the delivery line 80 through connection 220, passage 218, port 142 of valve bore 134, port 146, connection 216, and conduit 100 to motor 62. The turret 16 is accordingly driven clockwise when viewed from the top in Figure 5 by the action of the worm 64 on the stationary worm wheel 60. Oil is discharged from the motor through line 93, connection 214, ports 144 and 148, passage 222, connection 228 and conduit 82 to tank. The speed of turret movement will depend upon the distance to which the lever 94 is shifted, that is, the farther the lever is shifted to the right, the faster the turret will rotate. The turret will continue rotation at a speed corresponding to the angular displacement of the lever 94 and may be stopped by permitting the lever to shift to neutral position.

Opposite movement of the turret 16 is produced by shifting the lever 94 to the right in Figure 5 or downwardly and to the right in Figure 3, flow in this case being reversed and directed to the opposite side of the motor 62 through conduit 98.

Similarly the cage 40 may be rotated about the trunnions 30 by upward or downward movement of the lever 94 in Figure 5, the upward movement causing clockwise rotation in Figure 6 and the downward movement causing counterclockwise rotation. Simultaneous movement of both the turret about its pivot and the cage about its pivot may be obtained in varying degrees by appropriate shifting of the control handle 94 in the direction of the desired resultant movement. It will thus be seen that the action of the control lever 94 is such as to produce a motion of the gun and gunner's seat which exactly corresponds both in direction and in speed with the direction and amount of shifting of the handle 94.

During all such movements of the handle 94 the dashpots formed by the end chambers of bores 134 and 136 and by the restrictors 178 and 182 act to control the speed at which the handle 94 may be shifted. Thus, the more rapidly handle 94 is shifted, the greater is the resistance imparted to movement thereof by the oil being forced through the restrictors 178 and 182. In this way the "feel" of the handle 94 is made more or less stiff in proportion to the amount of acceleration the operator tries to give to the gun mount as a whole. Inasmuch as the principal load on the fluid motors is an inertia load and since the force required to move the load is proportional to the product of its mass and the acceleration imparted thereto, it will be seen that the "feel" or resistance to movement of the handle 94 varies in substantial accordance with the load which is to be imposed on the fluid motors 62 and 68.

This results in a control whereby the operator is apprised of the effort required to move the gun mount in accordance with his wishes and gives a "feel" at the control handle much the same as if his efforts were applied directly in shifting the mount. This is particularly advantageous where, as in aircraft, the permissible weight of the driving mechanism is held down to a minimum and where accordingly the driving equipment might be easily overloaded if the resistance to movement of the control handle were the same whether it be moved rapidly or slowly. By the provision of this variable resistance to movement of the control handle, there is in practical effect achieved a positive limit to the maximum acceleration which can be imparted to the gun mount, which limit is determined by the maximum manual effort which a given operator is able to apply toward shifting the control handle. Adjustment of this resistance may be varied to suit operators of different muscular strength by suitable adjustment of the restrictors 178 and 182.

While the form of embodiment of the invention as herein disclosed constitutes a preferred form, it is to be understood that other forms might be adopted, all coming within the scope of the claims which follow.

What is claimed is as follows:

1. In a hydraulic power transmission system the combination with a source of pressure fluid and a pair of fluid motors for driving a load device in each of two directions in perpendicular planes, a pair of control valves arranged side by side and each having a longitudinally shiftable operating stem, and a single operating lever universally pivoted on a center spaced from a plane including the lines of travel of said stems, said operating lever having an operating connection with each stem whereby the lever may be rocked in a plane including the line of travel of one stem to shift said stem without shifting the other or vice versa and may be rocked in other intermediate planes to variably shift both stems in different proportion.

2. In a hydraulic power transmission system the combination with a source of pressure fluid and a pair of fluid motors for driving a load device in each of two directions in perpendicular planes, a pair of control valves arranged side by side and each having a longitudinally shiftable operating stem, and a single operating lever universally pivoted on a center spaced from a plane including the lines of travel of said stems, said operating lever having an operating connection with each stem whereby the lever may be rocked in a plane including the line of travel of one stem to shift said stem without shifting the other or vice versa and may be rocked in other intermediate planes to variably shift both stems in different proportion, said valve being mounted with the operating lever oriented for rocking movement in the same directions in space as the load device.

3. In a hydraulic power transmission system the combination with a source of pressure fluid and a pair of fluid motors for driving a load device in each of two directions in perpendicular planes, a pair of fluid flow-controlling members for selectively directing fluid from the source to said motors arranged side by side and each having a longitudinally shiftable operating stem, and a single operating lever universally pivoted on a center spaced from a plane including the lines of travel of said stems, said operating lever having an operating connection with each stem whereby the lever may be rocked in a plane including the line of travel of one stem to shift said stem without shifting the other or vice versa and may be rocked in other intermediate planes to variably shift both stems in different proportion.

4. A dual valve for controlling fluid flow to separate circuits simultaneously and independently comprising in combination a pair of control valves arranged side by side and each having a longitudinally shiftable operating stem, and a single operating lever universally pivoted on a center spaced from a plane including the lines of travel of said stems, said operating lever having an operating connection with each stem whereby the lever may be rocked in a plane including the line of travel of one stem to shift said stem without shifting the other or vice versa and may be rocked in other intermediate planes to variably shift both stems in different proportion.

5. In a hydraulic power transmission system the combination with a source of pressure fluid and a fluid motor for driving an inertia load in either direction at variable speeds of a control member shiftable in varying degree to either side of a neutral position for selectively controlling the direction and rate of fluid flow to the motor in proportion to the degree of movement of the member away from neutral position whereby the rate of movement of the member determines the acceleration of the load device, a manually operable device for shifting the control member, and means for resisting movement of the control member with a force which increases with increased speed of movement of the control member whereby the "feel" of the manual device is in general proportion to the load imposed on the fluid motor during all movements of the manual device.

6. In a hydraulic power transmission system the combination with a source of pressure fluid and a fluid motor for driving an inertia load in either direction at variable speeds of a control valve shiftable in varying degree to either side of a neutral position for selectively controlling the direction and rate of fluid flow to the motor in proportion to the degree of movement of the valve away from neutral position whereby the rate of movement of the valve determines the acceleration of the load device, a manually operable device for shifting the valve, and means for resisting movement of the valve with a force which increases with increased speed of movement of the valve whereby the "feel" of the manual device is in general proportion to the load imposed on the fluid motor during all movements of the manual device.

7. In a hydraulic power transmission system the combination with a source of pressure fluid and a fluid motor for driving an inertia load in either direction at variable speeds of a control member shiftable in varying degree to either side of a neutral position for selectively controlling the direction and rate of fluid flow to the motor in proportion to the degree of movement of the member away from neutral position whereby the rate of movement of the member determines the acceleration of the load device, a manually operable device for shifting the control member, and dashpot means associated with said control member and including a fluid restrictor connected to pass all fluid flow to or from the dashpot in both directions.

8. In a hydraulic power transmission system the combination with a source of pressure fluid and a fluid motor for driving an inertia load in either direction at variable speeds of a control member shiftable in varying degree to either side of a neutral position for selectively controlling the direction and rate of fluid flow to the motor in proportion to the degree of movement of the member away from neutral position whereby the rate of movement of the member determines the acceleration of the load device, a manually operable device for shifting the control member, and means including a dashpot for resisting movement of the control member with a force which increases with increased speed of movement of the control member whereby the "feel" of the manual device is in general proportion to the load imposed on the fluid motor during all movements of the manual device.

DUNCAN B. GARDINER.